(12) United States Patent
Lipton et al.

(10) Patent No.: US 7,002,618 B2
(45) Date of Patent: Feb. 21, 2006

(54) PLANO-STEREOSCOPIC DVD MOVIE

(75) Inventors: Lenny Lipton, Greenbrae, CA (US); Mark H. Feldman, Walnut Creek, CA (US)

(73) Assignee: Stereographics Corporation, Beverly Hills, CA (US)

(*) Notice: Subject to any disclaimer, the term of this patent is extended or adjusted under 35 U.S.C. 154(b) by 285 days.

(21) Appl. No.: 10/160,595

(22) Filed: May 31, 2002

(65) Prior Publication Data

US 2002/0196332 A1   Dec. 26, 2002

Related U.S. Application Data

(60) Provisional application No. 60/295,260, filed on Jun. 1, 2001.

(51) Int. Cl.
 *H04N 13/04* (2006.01)
(52) U.S. Cl. ....................................................... 348/51
(58) Field of Classification Search ............ 348/42–53; 704/230; 386/111; 396/324; 375/240.15; H04N 13/04
See application file for complete search history.

(56) References Cited

U.S. PATENT DOCUMENTS

| | | | | |
|---|---|---|---|---|
| 5,627,582 A * | 5/1997 | Muramoto et al. | ............ | 348/43 |
| 5,812,971 A * | 9/1998 | Herre | ......................... | 704/230 |
| 6,414,996 B1 * | 7/2002 | Owen et al. | ........... | 375/240.17 |
| 6,574,423 B1 * | 6/2003 | Oshima et al. | ............. | 386/111 |
| 6,704,042 B1 * | 3/2004 | Matsui et al. | .................. | 348/43 |
| 2002/0009299 A1 * | 1/2002 | Lipton | ........................ | 396/324 |

* cited by examiner

*Primary Examiner*—Tung Vo
(74) *Attorney, Agent, or Firm*—Jeffer Mangels Butler & Marmaro

(57) ABSTRACT

A stereoscopic media player is implemented by a software application loaded onto a PC having a DVD player and a video monitor interconnected therewith. The software application includes program instructions for mapping stereoscopic images stored in a side-by-side format on the DVD into an above-and-below format for display on the monitor.

4 Claims, 4 Drawing Sheets

PLANO-STEREOSCOPIC DVD MOVIE

This application claims the benefit of Provisional Application 60/295,260 filed Jun. 1, 2001.

BACKGROUND

The present invention includes a method and apparatus for encoding and playing back full-screen flicker-free plano-stereoscopic movies using a personal computer (PC) equipped with a DVD (Digital Versatile Disc) player and a cathode ray tube (CRT) monitor. The term "movies" as used herein denotes a succession of still images, whether photographed from the visual world by means of a motion picture or video camera, produced by means of a computer, or any other means, which when played back in rapid succession give the illusion of motion. The term plano-stereoscopic denotes a stereoscopic image made up of two planar perspective views (a stereo-pair). For the sake of brevity, throughout this disclosure, we will usually use the term stereoscopic. We are using the term video to denote a raster-based electronic moving image created from a succession of a fields or pictures.

We have chosen to focus our efforts on playing back recorded stereoscopic movies on a PC screen rather than on a television screen. A TV set is an appliance with a fixed vertical rate, which in the United States is 60 fields per second. This frequency is set in manufacture of the set and cannot be altered. For the display of flicker-free stereoscopic field-sequential movies, a vertical rate of at least half again more is required.

PCs often incorporate a DVD player and a CRT monitor for display. Such a PC has the necessary digital storage and processing power to decode the stereoscopically-formatted DVD we disclose here. We shall discuss how the PC components and the Stereoscopic Media (or Movie) Player (SMP) we have devised work together to help achieve our goal of playing back a flicker-free stereoscopic field-sequential movie.

In the field-sequential approach, a succession of left and right images alternate, and these left and right images form a stereoscopic moving image. The user wears a selection device (i.e., eyewear) which alternately blocks the stream of images of one perspective and passes the stream of images of the other perspective. The eyewear use a pair of liquid crystal shutters that operate out of phase with each other but in synchrony with the vertical field rate of the video signal. Products like these have been manufactured for two decades by StereoGraphics Corporation, San Rafael, Calif., the company that introduced flicker-free field-sequential stereoscopic electronic images. This art is described in the following patents: U.S. Pat. No. 5,572,250 entitled Universal Electronic Stereoscopic Display; U.S. Pat. No. 5,463,428 entitled Wireless Active Eyewear For Stereoscopic Applications; U.S. Pat. No. 5,416,510 entitled Camera Controller For Stereoscopic Video System; U.S. Pat. No. 5,239,372 entitled Stereoscopic Video Projection System; U.S. Pat. No. 5,193,000 entitled Multiplexing Technique For Stereoscopic Video System; U.S. Pat. No. 5,181,133 entitled Drive Method For Twisted Nematic Liquid Crystal Shutters For Stereoscopic And Other Applications; U.S. Pat. No. 5,117,302 entitled High Dynamic Range Electro-Optical Shutter For Stereoscopic And Other Applications; U.S. Pat. No. 4,967,268 entitled Liquid Crystal Shutter System For Stereoscopic And Other Applications; U.S. Pat. No. 4,884,876 entitled Achromatic Liquid Crystal Shutter For Stereoscopic And Other Applications; U.S. Pat. No. 4,792,850 entitled Method And System Employing A Push-Pull Liquid Crystal Modulator; U.S. Pat. No. 4,583,117 entitled Stereoscopic Video Camera; U.S. Pat. No. 4,562,463 entitled Stereoscopic Television System With Field Storage For Sequential Display Of Right And Left Images; and U.S. Pat. No. 4,523,226 entitled Stereoscopic Television System.

With reference to FIG. 1a, we see a person (107) using the principal hardware components employed for viewing stereoscopic movies with a PC. The strength of our invention is that it is able to use these commonly employed components. It is our desire to be entirely compatible with the existing infrastructure of devices commonly employed in order to gain the greatest possible audience. Our system is designed to work with any PC (101) employing a DVD player (102, shown for purposes of illustration with its caddy open). The monitor (103) is shown with an image on the CRT display screen (104), the image appearing to be doubled, as would be the case for a field-sequential stereoscopic image seen without wearing shuttering eyewear. An infrared (IR) emitter (105) is emitting IR pulses (106) which communicate with a receiver (not shown) in the selection device, active eyewear (108). Both PC and monitor are made to run at a flicker-free field rate as will be described below.

The DVD is a medium designed to play at a fixed field rate of 60 fields per second (in the United States), which is too low to be flicker-free in the stereoscopic mode, as noted above. It is a format that uses a form of compression, actually a series of techniques, known as MPEG-2. This protocol has characteristics that might destroy stereoscopic content. The MPEG-2 protocol uses a form of compression in the temporal dimension that would, for some formats such as the interlaced method, ruin stereoscopic content by blending left and right fields. Therefore, it was necessary for us to devise a means that will preserve the integrity of the perspective components of the plano-stereoscopic image. This had to be accomplished in the context of the existing infrastructure relying on standard MPEG-2 compression.

Another aspect of the invention is that we had to devise a means for taking our compressed stereoscopic images and decompressing them in a format that will play on any non-stereo ready PC, video accelerator board and other hardware components notwithstanding. It is also important to realize that this might be accomplished with the addition of a specialized hardware solution, namely a video add-on board. However, the typical user is not inclined to add boards to his or her PC, so an entirely software solution was sought for our SMP. Yet another aspect of our SMP is a means for playing back a stereoscopic image at a high enough field rate so it will be flicker-free. This must be accomplished despite the fact that the DVD medium and the PC infrastructure do not take our goal into account and are designed to work at a lower refresh rate.

We have conceived of and developed a multiplexing and de-multiplexing approach that maximizes sharpness and image quality, in a form that is compatible with the standard DVD and MPEG-2 protocols. As has been stated, we sought to achieve our end without the need for the user to add an additional video processing board to his or her PC. Thus we have achieved our end by devising a software based media player, namely our SMP.

The means for accomplishing these ends, which we have achieved in our laboratory, are described below.

SUMMARY OF THE INVENTION

A stereoscopic media player is realized through software. The software is loaded onto a conventional PC that has a DVD player and a video monitor interconnected therewith. The software includes program instructions for mapping stereoscopic images stored on a DVD in a first format (preferably a side-by-side format) into a second format used for rendering the images onto the monitor.

In the preferred embodiment, the program instructions define a filter graph. A source filter is defined to receive a DVD signal having video and audio components from the DVD. A splitter is defined to receive the DVD signal from the source filter and to divide the signal into a video component and an audio component. A video decoder is defined to receive the video component from the splitter and to decode the video component. The video component is then converted from the first format into a second format and the converted video component is rendered on the monitor.

DETAILED DESCRIPTION OF THE INVENTION

Figure 1A:
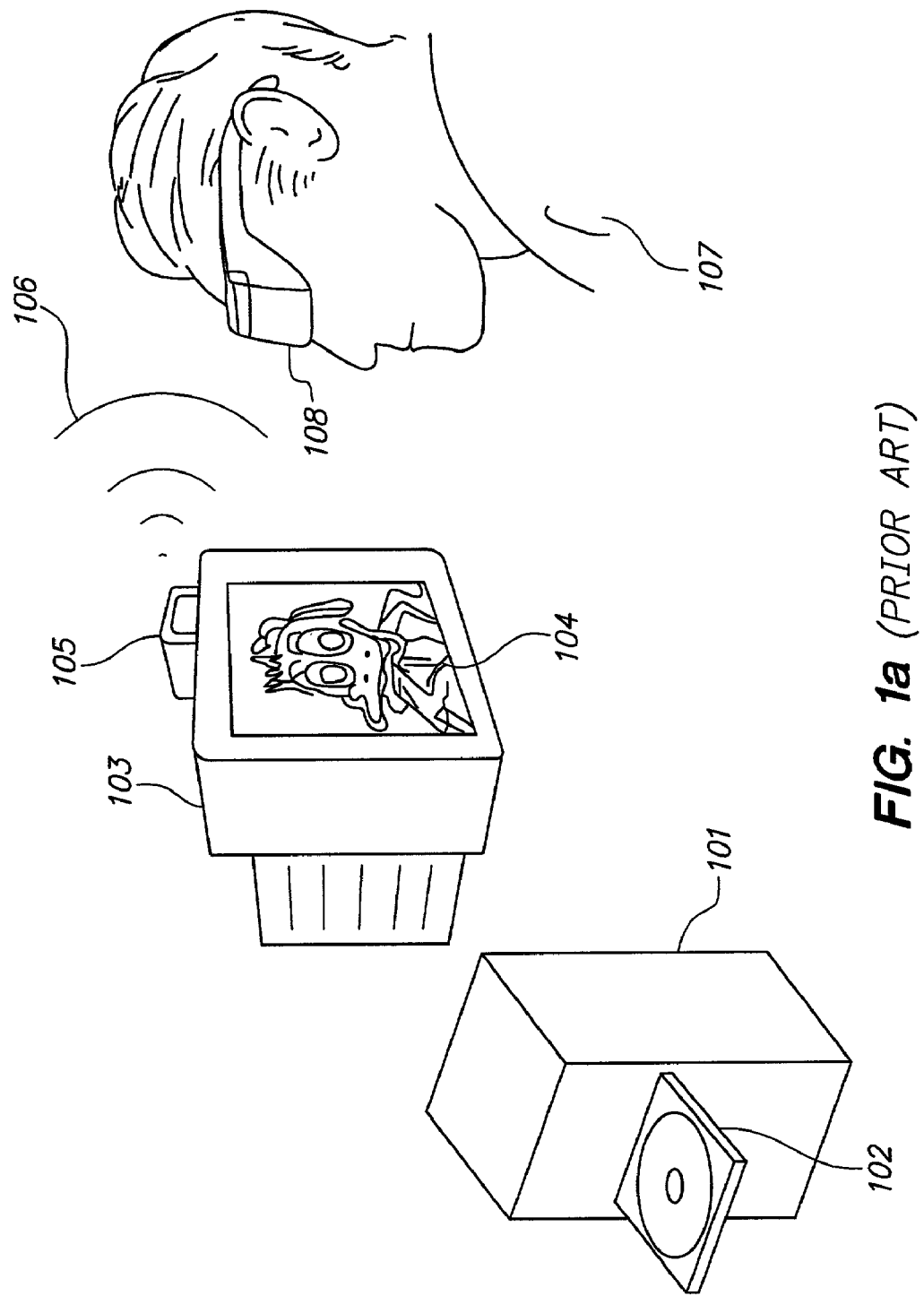
FIG. 1a is a perspective view of a user viewing a stereoscopic movie played back on a system having a PC and CRT monitor.
Figure 1B:
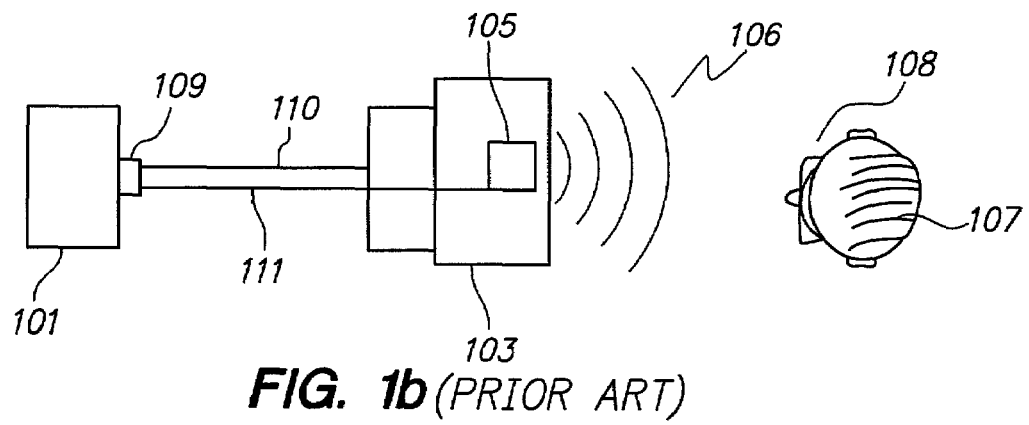
FIG. 1b is a block diagram showing the electronic cabling between components and the IR link in the system of FIG. 1.

FIG. 1b is a diagram of a typical setup for viewing field-sequential stereoscopic movies with the aid of a wireless active eyewear selection device. This arrangement is prior art and disclosed for the purpose of providing background to the description of the invention.

Electronic cabling between the system components is shown in FIG. 1b. A dongle (109) is connected to PC (101) at the VGA video port. The dongle observes the video signal emerging from the PC video board and adds a vertical synchronization pulse to the subfield blanking area as will be described below with the aid of FIG. 2a. The video signal is carried by means of a cable (110) to the monitor (103). Cable (111), between the dongle (109) and the IR emitter (105), carries left and right field synchronization formation to the IR emitter (105), which operates as described above with regard to the eyewear (108).

FIG. 1b illustrates one of many possible configurations that are used for using wireless active eyewear for viewing stereoscopic content, but it should be noted that the nature of this disclosure is not limited to any particular scheme. In addition, there are on-screen-polarizing modulators, using passive polarizing eyewear, which produce the same effect as active eyewear. StereoGraphics Corp. makes both types of selection devices: CrystalEyes® active eyewear, and the ZScreen® modulator for passive eyewear. For that matter, the decoded stereoscopic signal might be viewed using a head-mounted display (HMD) or other device.

The PC has a DVD player for playing video content, as shown in FIG. 1a. In accord with the present invention, a software application for enabling a Stereoscopic Media Player (SMP) is loaded onto the PC. The use of the SMP software to add stereoscopic capability, rather than a special electronics board, is an important feature of the invention.

Figure 2A:
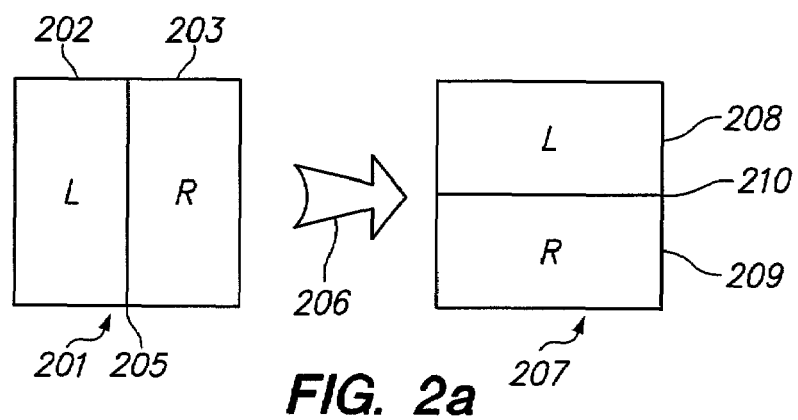
FIG. 2a is a diagram showing the transition from a side-by-side format to an above-and-below format.

FIG. 2a illustrates the transformation from the DVD encoded image to the format derived by the SMP. We use the side-by-side format 201 as described by Lipton et al. in U.S. Pat. No. 5,193,000 entitled Multiplexing Technique For Stereoscopic Video System. The left and right images, 202 and 203, respectively, are separated by a vertical boundary, 205, which may be zero pixels in width to maximize resolution. Although we show the left image to be the left sidefield and the right image to be the right sidefield, these could be inverted. However, for the sake of standardization, in order to avoid the display of a pseudostereoscopic image, one must be consistent in terms of allocation of views and sidefields (as will be understood with respect to subfields as well).

The sidefield approach, in which the images are anamorphically squeezed by a factor of two, was chosen for this application because the DVD format is especially rich in horizontal resolution. It is rated with a 720-pixel line resolution along a horizontal line, or about twice the resolution of the usual home TV signal (NTSC protocol). As will be understood, once the image is reformatted for play back on the PC display monitor, each perspective has the potential of having 360-pixel resolution along a horizontal line, or about the resolution one is accustomed to seeing when viewing home TV. If we had used the above-and-below format for DVD encoding, we would have squandered horizontal resolution, which would have remained at 720 pixels-per eye, and lost vertical resolution during interpolation as we restored the aspect ratio. The image is intended to be played back in the standard Edison aspect ratio of 1.3:1, enabled by the various topological transformations that take place throughout the process.

Additionally, the possible destruction of stereoscopic content resulting from MPEG-2 compression has been avoided because of the topology of the side-by-side format that avoids inter-field artifacts. Any compression that takes place will affect pixels within each sidefield as isolated entities and will not contribute to the degradation of the stereoscopic effect.

The function of the SMP is entirely contained within the step signified by arrow 206. It is the function of the SMP to, in a nearly real-time mode, translate the side-by-side format, 201, into the above-and-below format, 207. The purpose of this reformatting is to endow the image with the virtues of the above-and-below format. One does not need to have a special stereo-ready video accelerator board installed in the PC which uses the above-and-below format, as described in Lipton et al.'s U.S. Pat. No. 4,523,226, which is incorporated herein by reference.

The above-and-below format, 207, uses left and right perspectives squeezed anamorphically in the vertical direction by a factor of two. The subfields, 208 and 209, are separated by a subfield blanking area, 210. When this signal is played back by the video board set for the normal field rate, say 60 fields per second, the result on the display monitor is a field-sequential image running at twice the field rate, or 120 fields per second, which produces a flicker-free image.

As noted, it is the job of the dongle 109 to add a vertical synchronization pulse within the subfield banking area 210. Once the monitor 103 sees the video signal with the added pulse, the image will be played back at twice the normal field rate with the subfield images restored to normal Edison aspect ratio proportions.

The key to understanding the above-and-below format is the fact that images which are displayed in the above-and-below format at the normal field rate will have this spatial juxtaposition turned into a temporal juxtaposition when the image is played back on a monitor which sees the added subfield blanking pulse.

In experiments we have performed, using the SMP described in detail below, we have played back moving images formatted as described above which were delightful to view. The image was played back from a normally encoded MPEG-2 DVD videodisc with a resolution of 760 by 480 pixels. It was then transformed by the SMP into an image of 800 by 600 pixels per eye. The effective resolution in point of fact was only 360 by 480 pixels per eye, but as noted, the result was quite pleasing. It should also be noted that an added virtue of our process is that normal DVD MPEG-2 encoding was employed adding to the usefulness and compatibility of the process. Any as-is DVD postproduction facility may be used for producing masters.

Figure 2B:
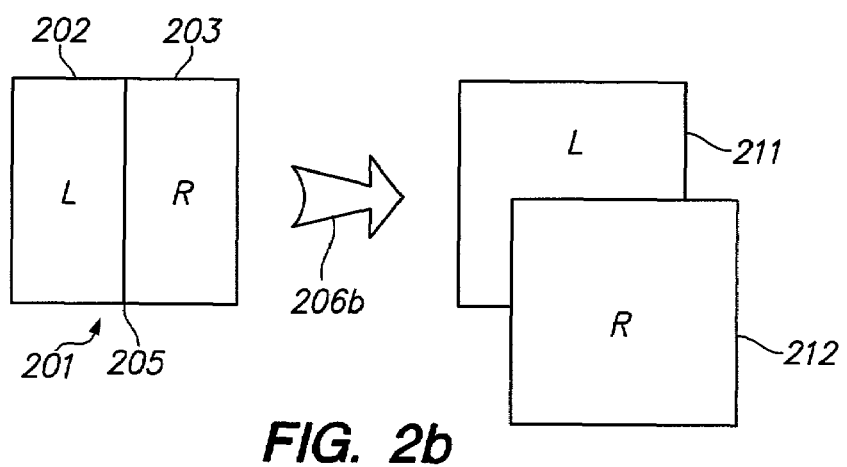
FIG. 2b is a diagram showing the transition from a side-by-side format to a page-flipping format.

FIG. 2b is readily comprehended having had the benefit of discussing its counterpart, FIG. 2a. In this case the sidefields are reformatted by SMP process 206b into left and right images 211 and 212, respectively, which are now in the page-flipping (or page-swapping) mode, as opposed to the above-and-below format shown in FIG. 2a. An alternative display technique, described with the aid of FIG. 2b, is to display the frames in the page-flipped stereo mode. Page-flipping is a display technique popular on many high-end stereo-ready graphics cards, which use two buffers (referred to as a primary buffer and a back buffer) to contain display images. The graphics hardware will synchronously flip or alternate between them causing the video display to alternately show each image.

Such an image may also be played back with a video board that is not intrinsically stereo-ready and that has been induced to play in a page-flipping mode by means of software drivers that emulate the stereo-ready mode.

We will now describe the SMP technology.

The DVD format contains a number of features which make viewing movies and other content an enjoyable, educational, and semi-interactive experience. The directory structure on a DVD contains various files of different content types to enable this experience. We will concern ourselves with the VOB files, which contain the DVD video content.

VOB files are compressed using an MPEG-2 technology. This compression involves a number of conventional technologies (color space conversion, forward/backward frame prediction, motion compensation, Discrete Cosine Transfers, and Huffman encoding) that serve to optimally encode the video frames for a specific playback data rate.

The SMP utilizes an established framework for playing back digital media and including our above-and-below format transformation. The framework we have used is Microsoft's DirectShow application software, which is under Microsoft's DirectX technology umbrella. DirectShow is an open architecture for developing streaming media applications on the Microsoft Windows platform and has recently been updated to support the DirectX 8 library.

The DirectShow architecture simplifies media playback, format conversion, and capture tasks needed to describe a particular video application. In this flexible environment, media components such as input devices, filters, and video renderers can be software-connected to create a useful solution. Note that the term "filter graph" refers to a description of the interconnected components, as will be discussed below.

DirectShow includes a Filter Graph Editor, which allows for the interactive construction of a filter graph. This tool has proven invaluable in the creation of the SMP where various components can be tested in different modes. Each component has a series of input pins and output pins that accept a particular data type (e.g. MPEG-2 video). The Filter Graph Editor ensures that output pins only connect to input pins which can agree upon a commonly supported data type. DirectShow supports a number of standard audio, image, and video data types, including MPEG-2.

Figure 3:
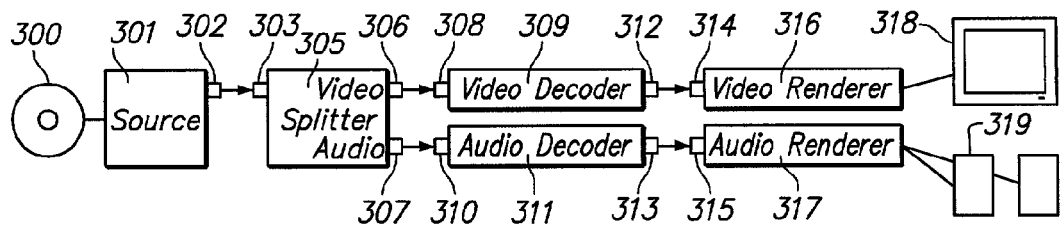
FIG. 3 is a filter graph describing the data flow of playing a video.

FIG. 3 shows a filter graph, which describes the data flow of playing a video. The data is said to be streamed because each frame of the video is sent down the graph rather than waiting for the entire video to be processed as a whole. A DVD (300) contains compressed MPEG-2 video which is played back on a PC. The source filter (301) reads the MPEG-2 video data from a DVD. The source filter (301) sends the compressed MPEG-2 data through output pin (302) that is connected to a Splitter (305) via input pin (303). The Splitter (305) divides the data stream into a video component and audio component. The video component is sent through output pin (306) to a Video Decoder (309) via input pin (308). The audio component is sent through output pin (307) to an Audio Decoder (311) via input pin (310). The Video Decoder (309) decompresses the MPEG-2 video data and sends the information through output pin (312) to a Video Renderer (314) via input pin (313). The Audio Decoder (311) decompresses the MPEG-2 audio data and sends the information through output pin (313) to an Audio Renderer (315) via input pin (314). The Video Renderer (314) subsequently displays the video on a standard PC monitor (316) and the Audio Renderer plays the audio on standard PC speakers (317).

DirectShow can implement the above scheme with components from various manufactures using different data compression and formats. The filter graph manager requires that these components agree on a common data format before they are connected. The implementation of various solutions using these tools will be readily apparent to one with ordinary skill in this technology area.

Figure 4:
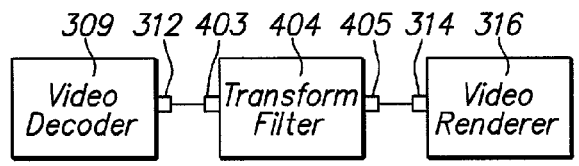
FIG. 4 is a subset of the filter graph shown in FIG. 3 with a transform filter inserted between the video decoder and the video renderer.

We require that the video data be converted from the side-by-side format to the above-and-below format. This conversion can occur in two ways. First, the transformation can be implemented by a transform filter, which is subsequently inserted between two components in the filter graph. In FIG. 4, which shows a subset of the filter graph shown in FIG. 3, a transform filter (404) is inserted between the video decoder (309) and the video renderer (314) by connecting the video decoder's output pin (312) with the transform filter's input pin (403) and also connecting the transform filter's output pin (405) with the input pin (313) of the video renderer.

Figure 5:
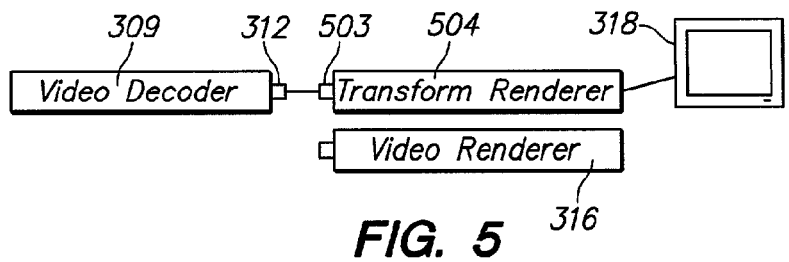
FIG. 5 is a subset of the filter graph shown in FIG. 3 in which a transform renderer replaces the Video Renderer.

Second, the transformation can by performed by a new implementation of a video renderer, which accomplishes the transformation in conjunction with rendering the video data on the screen. In FIG. 5, which shows another subset of the filter graph shown in FIG. 3, a transform renderer (504) replaces the Video Renderer (314). The transform renderer (504) is connected to the video decoder (309) by connecting the video decoder's output pin (312) with the transform renderer's input pin (503). As before, the renderer displays the video on a computer PC monitor (316).

The decision to implement the transform either the first or second way depends on several factors including the amount of the file formats which need to be supported at a given stage and the desired video playback performance. We have found implementing the transform filter was simpler, but the resulting playback performance was slower. However, implementing as a transform renderer required much more development work because the software was performing the actual pixel rendering and there was less data copying. Hence the playback performance difference was hardly noticeable.

Next, we will describe the mapping from the side-by-side format to the above-and-below format. The mapping is an efficient way to stretch the image from the side-by-side format to the above-and-below format. More accurate methods exist which account for fractional pixels and also minimize aliasing artifacts, however the method described here results in a faster implementation requiring far fewer calculations. The mapping of an input pixel index is defined as the index of the side-by-side pixel to use when rendering the pixel. If the mapped index=−1, then the pixel is unmapped and should be rendered black.

Figure 6:
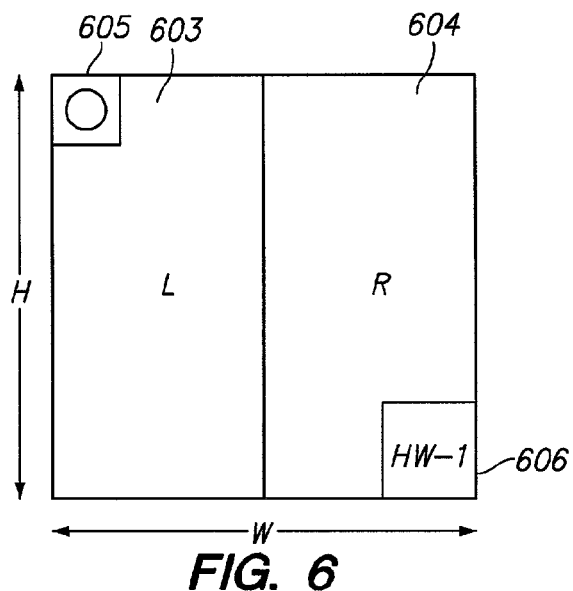
FIG. 6 is a diagram showing one possible pixel layout of the side-by-side format as used in the invention.

The side-by-side image, in a mapping context, is described in FIG. 6. The image has dimensions W pixels wide and H pixels tall and is divided into a left half (603) and right half (604). The bitmap pixels are indexed starting in the top left corner (605) with value 0 and increasing left to right, top to bottom and ending in the bottom right corner (606) with value H*W−1.

Figure 7:
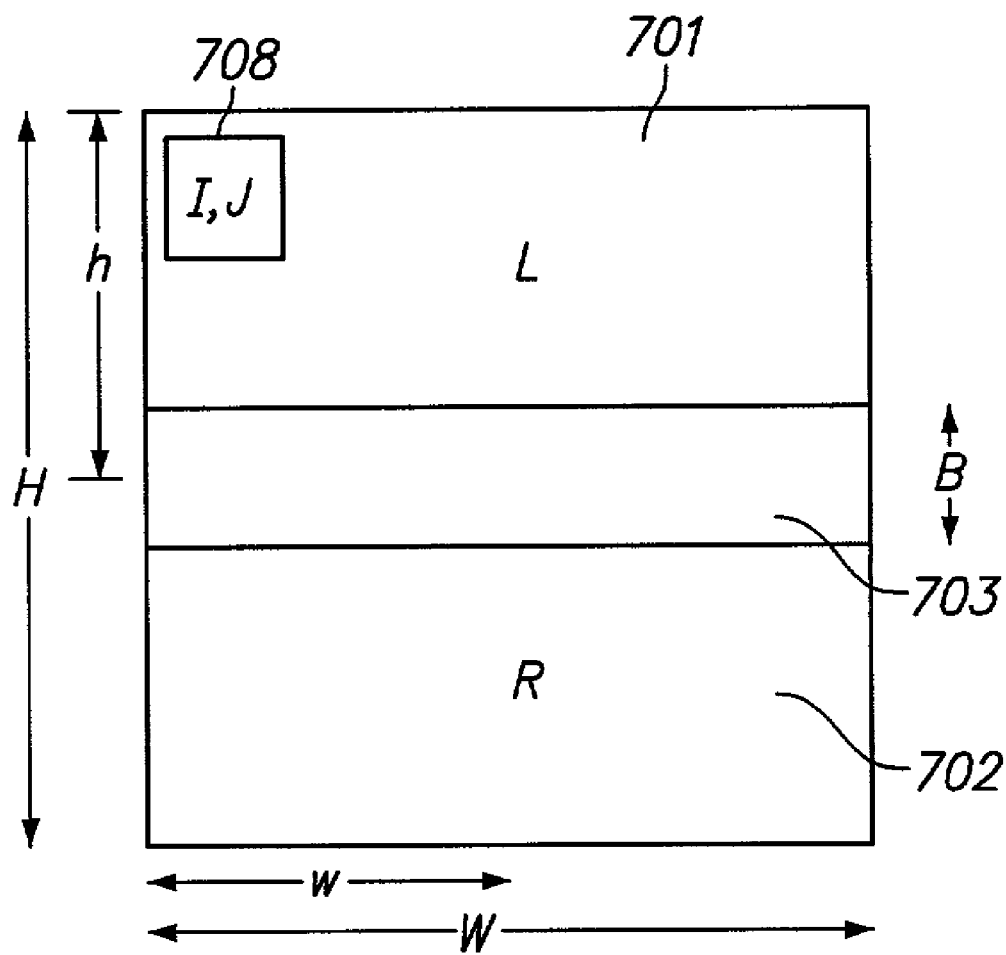
FIG. 7 is a diagram showing one possible pixel layout of the above-and-below format as used in the invention.

The above-and-below image, in a mapping context, is described in FIG. 7. The above-and-below image contains the left view (701), right view (702), and a blanking area (703). The above-and-below image also has the same dimensions W and H as the side-by-side image. The above-and-below images are separated by a blanking distance measured in horizontal scan lines represented by B. For convenient notation, half of the width W is w, half of the height H is h, and half of the blanking distance B is b.

A mapping that describes which pixel to use from the side-by-side image can now be calculated. This mapping describes pixel indexes and can be easily adjusted to point to color components stored in memory such as with a 2 or 3 byte/pixel schemes. Each pixel in the above-and-below image can be represented by the coordinates [i,j] (708) where i is a value ranging from 0 to W−1 and j is a value ranging from 0 to H−1. For each pixel in the above-and-below image, one the following three cases apply:

1) The pixel is in the left section (701). The index to use is: index=j*W*H/(h−b)+i/2
2) The pixel is in the right section 702. The index to use is index=(j−h−B)*W*H/(h−b)+w+i/2
3) The pixel is in the blanking section 703. The pixel is unmapped. index=−1

An efficient implementation will precalculate the mapping in advance because all of its calculations are invariant frame to frame. This will require that the memory to define the map remains unchanged during the playback.

An improvement in the algorithm allows for the dynamic changing of the size of the blanking area. This is advantageous because the results of the sync doubling operation will vary depending on the vertical refresh frequency and characteristics of the playback monitor. During playback, or perhaps during an initial configuration mode, the application can request that the user adjust the size of the blanking area so that the left and right images are properly aligned during the sync-doubling mode of operation. If the mapping is precalculated, the mapping will need to be recomputed because it depends on the size of the blanking area. Automatic means for adjustment of the size of the blanking area or the proper centering of the subfields to avoid vertical parallax are also possible but go beyond the scope of this disclosure.

A further improvement bundles the transform filter and/or renderer into a self contained application, rather than requiring the Filter Graph Editor to connect the components and playback the video. DirectShow provides the software components to automatically duplicate these manual steps programmatically.

The images may also be displayed in the page-flipping mode, described above. When running on a PC with a page-flipping capable graphics card, the above-mentioned DirectShow application can be modified to utilize this page-flipping display capability rather than requiring an added vertical synchronization pulse for the above-and-below. In this new scenario, the Stereo Render will detect the page-flipping capability, and if so enabled, then write the left and right fields of each frame into the corresponding buffer. Appropriate steps in process need to be taken to control the aspect ratio of the final image. In addition, a variant of the page-flipped mode can be employed to playback stereo images using an HMD.

It will be obvious to those skilled in the art that it is possible to create variations with regard to the formatting and the mapping of the plano-stereoscopic images, but that such variations fall within the scope of this disclosure and the claims that follow.

What is claimed is:

1. A software method for playing stereoscopic DVD movies on a microprocessor-based system including a DVD player and a video monitor, comprising:
   providing a DVD that has been encoded with compressed stereoscopic images in a first format;
   providing program instructions for interactively constructing a filter graph, including:
      obtaining a DVD signal having video and audio components from the DVD;
      separating the video components from the audio components;
      decoding the compressed images;
      transforming the decoded images into a second format by mapping a plurality of pixels from the first format to the second format, wherein the mapping step creates an index for each pixel for use in rendering the pixels on the monitor, and wherein the second format includes a first image portion and a second image portion separated by a blanking portion, and wherein for a pixel (i,j) located in the first portion, the index is set equal to j*W*H/(h−b)+i/2; and wherein for a pixel (i,j) located in the second portion, the index is set equal to: (j−h−B)*W*H/(h−b)+w+i/2; and wherein for a pixel (i,j) located in the blanking portion, the pixel is unmapped and the index is set equal to −1; and
   providing the transformed images for display on a monitor.

2. A software method for playing stereoscopic DVD movies on a microprocessor-based system including a DVD player and a video monitor, comprising:
   providing a DVD that has been encoded with compressed stereoscopic images in a side-to-side format;
   providing program instructions for interactively constructing a filter graph, including:
      obtaining a DVD signal having video and audio components from the DVD;

separating the video components from the audio components;

decoding the compressed video images from the video components;

transforming the decoded images into an above-and-below format, wherein the above-and-below format includes a left image portion and a right image portion separated by a blanking portion, and wherein the transforming step comprises mapping a plurality of pixels from the side-by-side format to the above-and-below format by creating an index for each pixel for use in rendering the pixels on the monitor, and wherein for a pixel (i,j) located in the left image portion, the index is set equal to $j*W*H/(h-b)+i/2$; and wherein for a pixel (i,j) located in the right image portion, the index is set equal to: $(j-h-B)*W*H/(h-b)+w+i/2$; and wherein for a pixel (i,j) located in the blanking portion, the pixel is unmapped and the index is set equal to −1; and providing the transformed images for display on a monitor.

3. A stereoscopic media player in a microprocessor-based system including a DVD player and a video monitor, comprising program instructions for interactively constructing a filter graph from a DVD signal, whereby video data from the DVD signal is separated from the audio data, then decompressed and transformed from a side-by-side format to an above-and-below format, then rendered for display on the video monitor, wherein the above-and-below format includes a left image portion and a right image portion separated by a blanking portion, and wherein the program instructions include steps for mapping a plurality of pixels from the side-by-side format to the above-and-below format by creating an index for each pixel for use in rendering the pixels on the monitor, and wherein for a pixel (i,j) located in the left image portion, the index is set equal to $j*W*H/(h-b)+i/2$; and wherein for a pixel (i,j) located in the right image portion, the index is set equal to: $(j-h-B)*W*H/(h-b)+w+i/2$; and wherein for a pixel (i,j) located in the blanking portion, the pixel is unmapped and the index is set equal to −1.

4. A stereoscopic media player in a microprocessor-based system including a DVD player and a video monitor, comprising:

program instructions for interactively constructing a filter graph from a DVD signal obtained from a DVD in the DVD player, said DVD being encoded with stereoscopic images in a side-by-side format, including:

a source filter adapted to receive video and audio components from the DVD signal;

a splitter adapted to divide the DVD signal into a video component and an audio component;

a video decoder adapted to decode the video component; and a transform filter adapted to convert the decoded video component from a side-by-side format to an above-and-below format and to render the converted video component on the video monitor, wherein the above-and-below format includes a left image portion and a right image portion separated by a blanking portion, and wherein the program instructions include steps for mapping a plurality of pixels from the side-by-side format to the above-and-below format by creating an index for each pixel for use in rendering the pixels on the monitor, and wherein for a pixel (i,j) located in the left image portion, the index is set equal to: $j*W*H/(h-b)+i/2$; and wherein for a pixel (i,j) located in the right image portion, the index is set equal to: $(j-h-B)*W*H/(h-b)+w+i/2$; and wherein for a pixel (i,j) located in the blanking portion, the pixel is unmapped and the index is set equal to −1.

* * * * *